(12) United States Patent
Kaykov et al.

(10) Patent No.: US 10,990,868 B2
(45) Date of Patent: Apr. 27, 2021

(54) RFID DEVICE PROGRAMMING

(71) Applicant: HP Indigo B.V., Amstelveen (NL)

(72) Inventors: Lior Kaykov, Ness Ziona (IL); Gideon Amir, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/617,140

(22) PCT Filed: Jun. 20, 2017

(86) PCT No.: PCT/EP2017/065105
§ 371 (c)(1),
(2) Date: Nov. 26, 2019

(87) PCT Pub. No.: WO2018/233814
PCT Pub. Date: Dec. 27, 2018

(65) Prior Publication Data
US 2020/0184302 A1   Jun. 11, 2020

(51) Int. Cl.
*G06K 7/08* (2006.01)
*G06K 19/073* (2006.01)
*G06K 7/10* (2006.01)
*G06K 19/07* (2006.01)

(52) U.S. Cl.
CPC ... *G06K 19/07318* (2013.01); *G06K 7/10366* (2013.01); *G06K 19/0708* (2013.01)

(58) Field of Classification Search
CPC ..... G06K 7/08; G06K 17/002; G06K 17/0025
USPC .............. 235/449, 462.46, 472.02
See application file for complete search history.

(56) References Cited

U.S. PATENT DOCUMENTS

| | | | |
|---|---|---|---|
| 7,646,284 B2 | 1/2010 | Marowski et al. | |
| 9,459,273 B2* | 10/2016 | Moix | G01N 35/04 |
| 9,511,945 B2* | 12/2016 | Greyshock | G06F 19/00 |
| 9,898,633 B2* | 2/2018 | Bottazzi | G06K 7/10435 |
| 10,160,607 B2* | 12/2018 | Danelski | B65G 47/261 |
| 10,438,108 B2* | 10/2019 | Kreiner | G06K 19/07758 |
| 2008/0180247 A1 | 7/2008 | Deoalikar et al. | |
| 2008/0238686 A1 | 10/2008 | Tuttle | |

(Continued)

FOREIGN PATENT DOCUMENTS

| | | |
|---|---|---|
| EP | 1688863 | 8/2006 |
| EP | 2746992 | 6/2014 |

OTHER PUBLICATIONS

Infosolution, "A3Plate: A Compact Device for Reading and Writing Multiple RFID Tags Simultaneously," Published Sep. 2, 2016, Available at: <https://www.infosolution.it/index.php?option=com_virtuemart&view=productdetails&virtuemart_product_id=1&virtuemart_category_id=5&Itemid=798&lang=en>.

*Primary Examiner* — Daniel St Cyr
(74) *Attorney, Agent, or Firm* — Trop Pruner & Hu PC

(57) ABSTRACT

A radio frequency identification (RFID) device programming apparatus includes a transport system (102) to transport media (104) in a transport direction (106), and an RFID device reader (112) to obtain first device identification data from a first RFID device (108) on the media and second device identification data from a second RFID device (110) on the media that is offset from the first RFID device in the transport direction. A first RFID device programmer (114) may program the first RFID device associated with the first device identification data, and a second RFID device programmer (116) may program the second RFID device associated with the second device identification data.

17 Claims, 4 Drawing Sheets

700

(56) References Cited

U.S. PATENT DOCUMENTS

2009/0030313 A1    1/2009   Prater et al.
2010/0066511 A1    3/2010   Barnett et al.
2013/0161382 A1    6/2013   Bauer et al.

\* cited by examiner

RFID DEVICE PROGRAMMING

BACKGROUND

A Radio Frequency Identification (RFID) tag may be attached to a product and carry information relating to the product within memory. The information may comprise, for example, an electronic product code (EPC) and/or a serial number. The RFID tag may also be associated with a printed label. For example, the printed label may incorporate the RFID tag. The printed label may also include information relating to the product, such as the serial number.

BRIEF DESCRIPTION OF DRAWINGS

Examples will now be described, by way of non-limiting example, with reference to the accompanying drawings, in which.

DETAILED DESCRIPTION

RFID Tags may be combined with printed labels and programmed while the tags and labels are carried on a substrate. Each RFID tag has a unique device identification (ID). An RFID device reader may receive a wireless signal from the RFID tag that conveys the device ID. If the RFID tag is a passive tag, the reader may also provide a wireless signal to the tag from which the tag can extract energy to power the tag. A RFID device writer may program a tag by transmitting a wireless signal that identifies the tag using its device ID and provides information to be written to its memory.

Figure 1:
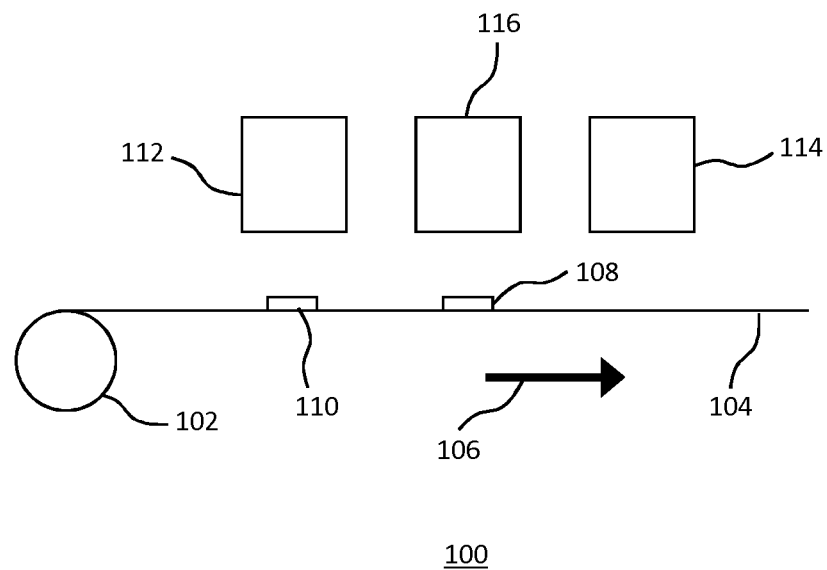
FIG. 1 is a simplified schematic of an example of an apparatus for programming RFID tags.

FIG. 1 shows an example of an apparatus 100, which may be for example a radio frequency identification (RFID) device programming apparatus. The apparatus comprises a transport system 102 to transport media 104 in a transport direction. The transport direction is in the direction shown by the arrow 106. The transport system 102 may in some examples include any suitable arrangement for transporting the media 104. For example, the apparatus may comprise one or more rollers, conveyors and/or other apparatus to move the media in the transport direction.

A first RFID device 108 and a second RFID device 110 are mounted on the media 104. In some examples, the RFID devices 108 and 110 are RFID tags. In some examples, each RFID device may be associated with a label. For example, the label may incorporate the RFID device, or the RFID device may be affixed to the label.

The apparatus 100 includes an RFID device reader 112 to obtain first device identification data from the first RFID device 108 and second device identification data from the second RFID device 110 that is offset from the first RFID device in the transport direction. That is, for example, as the media 104 moves in the transport direction 106 due to action by the transport system 102, the RFID tags 108 and 110 are positioned such that the first device 108 moves past the reader 112, followed by the second device 110. In some examples, the device identification data may be device IDs of the RFID devices 108 and 110.

The apparatus 100 includes a first RFID device programmer 114 to program the first RFID device 108. For example, the first RFID device programmer 114 may use the device ID of the first RFID device 108 to address the first RFID device 108 and write information to memory within the first RFID device 108. In some examples, the information may be related to information printed on a label associated with the first RFID device 108. The information may include, for example, an electronic product code (EPC), a serial number, and/or any other information. The memory may be a non-volatile memory such that the information is retained by the first RFID device 108.

The apparatus 100 also includes a second RFID device programmer 116 to program the second RFID device 110. For example, the second RFID device programmer 116 may program the second RFID device 110 in a manner similar to programming of the first RFID device 108 by the first RFID device programmer 114.

In some examples, the RFID device programmers 114 and 116 may program the first and second RFID devices 108 and 110 respectively when the respective device is in proximity to the device programmer. Therefore, in some examples, when a device identification is read by the reader 112, the device being read may be at a predetermined position, or within a predetermined area, within the apparatus 100. Consequently, as the transport system 102 moves the media 104 and devices 108 and 110 in the transport direction 106, the positions of the devices 108 and 110 may continue to be monitored or estimated, or the time at which devices with certain IDs arrive at certain positions may be determined. Therefore, programming of a device 108 or 110 may be initiated when the device is in proximity to the respective device programmer 114 or 116.

Multiple programmers 114 and 116 may allow the transport system 102 to transport the media 104 in the transport direction 106 more quickly than if a single programmer is present. Using multiple programmers may in some examples allow the time periods for programming multiple devices to partially or fully overlap, effectively allowing multiple devices that are offset in the transport direction (e.g. arranged along the length of the media 104) to be programmed in parallel. In the example apparatus 100 shown, two programmers 114 and 116 are present, though in other examples three or more programmers may be used.

A single RFID device reader 112 is present in the example apparatus 100 shown, as reading device identification data (e.g. a device ID) of a RFID device may take a shorter time period than programming a device. In some examples, programming a RFID device may take around three times as long as reading device identification data from a device.

In some examples, the RFID device programmers 114 and 116 are offset in the transport direction 106. This may allow the programmers to be in proximity to the devices that they are to program, when the devices are offset in the transport direction. In some examples, where there are n programmers for programming devices that are arranged on the media 104 along the transport direction 106, each programmer may program every nth device. For example, where there are two programmers, the first programmer may program the first, third and fifth devices, and so on, whereas the second programmer may program the second, fourth and sixth device, and so on. Where there are three programmers, the first programmer may program the first, fourth and seventh device, the second programmer may program the second, fifth and eighth device, and the third programmer may program the third, sixth and ninth device, and so on. In some examples, the n programmers may be used to program devices on the media that are arranged in a line along the transport direction. Therefore, the programmers may also be arranged along the transport direction.

Figure 2:
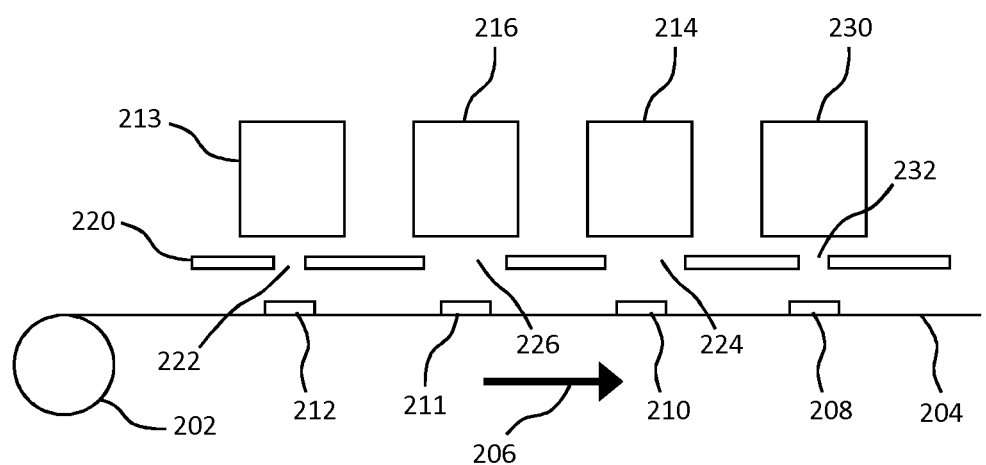
FIG. 2 is a simplified schematic of another example of an apparatus for programming RFID tags.

FIG. 2 shows an apparatus 200, which may be for example a radio frequency identification (RFID) device programming apparatus, that includes a transport system 202, media 204, a transport direction 206, a RFID device reader 213, first and second RFID device programmers 214 and 216, similar to components of FIG. 1. A first RFID device 208, a second RFID device 210, a third RFID device 211 and a fourth RFID device 212 are shown on the media 204. The apparatus 200 also includes an electromagnetic shield 220, such as a metal sheet for example, between the media 204 and the reader 213 and programmers 214 and 216.

The shield 220 includes a reader window 222 in proximity to the RFID device reader 213. The window 222 ensures that the reader will read identification data from each device as the media is transported in the transport direction 206, when each device is in a predetermined position or in a predetermined area. Thus, in some examples, the shield 220 prevents the reader 213 from reading from devices on the media 204 that are not in the predetermined position or within the predetermined area. In the example shown, the fourth device 212 is in the predetermined position, which is below the reader 213 such that the window 222 is between the reader 213 and the device 212. As the reader 213 reads each device when it is in the predetermined position or within the predetermined area, the position of a device having particular device identification data can be determined.

The electromagnetic shield 220 also includes a second window 224 in proximity to the first device programmer 214, such that a device may be programmed when the second window 224 is between the device and the first programmer 214. Similarly, the electromagnetic shield 220 also includes a third window 226 in proximity to the second device programmer 216, such that a device may be programmed when the third window 226 is between the device and the second programmer 216. In some examples, the windows 224 and 226 may be larger than the window 222 (e.g. the length in the transport direction may be larger). In this case, the devices on the media 204 can be read and programmed without stopping movement of the media 204, and the size (e.g. length of the window in the transport direction) of the windows 224 and 226 may be selected such that the programmers 214 and 216 have sufficient time to program devices before each device being programmed moves beyond the window. Similarly, in some examples, the size (e.g. length in the transport direction) of the reader window 222 may be selected to allow the reader to read each device in the predetermined position, or as it moves through the predetermined area, whilst preventing the device from reading other devices on the media 204.

The programmers 214 and 216 may utilize device identification data (e.g. device IDs) read by the reader 213 to address devices as they pass the programmers 214 and 216 to program the correct devices. That is, for example, the programmers 214 and 216 write the correct data into memory of each device. The data may comprise, for example, an EPC and/or serial number and may in some examples be linked to information shown on a printed label associated with each device.

The apparatus 200 also includes a verification RFID device reader 230. The verification reader 230 reads each device on the media 204 to verify that each device has been programmed correctly. The electromagnetic shield 220 may include a further window 232 to allow wireless communications between the verification reader 230 and the devices. For example, the verification reader 230 may read information that is stored internally in each RFID device as the devices move past the verification reader 230. The verification reader may use the device IDs read by reader 213 to address each device as it moves past the verification reader 230.

In some examples, the position of a device having a particular device identification data may be tracked. That is, for example, the apparatus 200 is to track a position of the first RFID device after the RFID device reader 213 has obtained the first device identification data, and track a position of the second RFID device after the RFID device reader 213 has obtained the second device identification data. For example, if the device is in a predetermined position or within a predetermined area when its identification data is read by reader 213, then subsequent movement of the device due to movement of the media 204 may be tracked (for example, by considering the movement speed of the media 204 through the apparatus and the distance between components of the apparatus 200). The apparatus 200 may therefore determine when the device having a particular identification data moves past one or more of the writers 214 and 216 and verification reader 230 such that the writer and/or verification reader can communicate with the device as it moves past. While using the device identification data to address the device in such communications may prevent the writer or verification reader from addressing the wrong device, having the device in proximity to the writer or reader during such communications may contribute to reliability of such communications (e.g. by ensuring a high signal strength between the device and the reader or writer).

The windows 222, 224, 226 and 232 may each be an opening in the electromagnetic shield 220 or may be of a material that allows wireless communications to pass through. In some examples there may also be further electromagnetic shielding between two or more of the reader 213, writers 214, 216 and verification reader 230.

Figure 3:
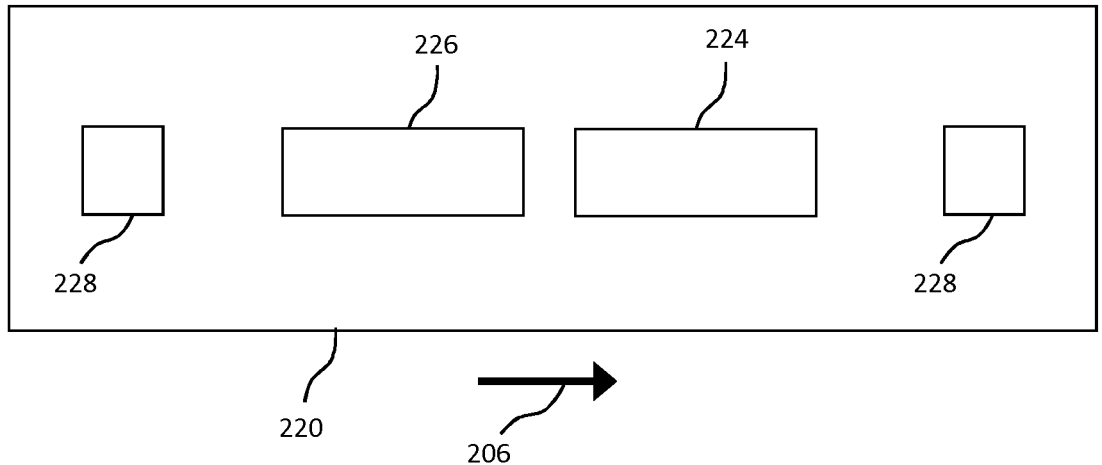
FIG. 3 is a simplified schematic of an example of an electromagnetic shield.

FIG. 3 shows a different view of the electromagnetic shield 220 and the windows 222, 224, 226 and 232. Also shown is the transport direction 206. It can be seen that the windows 224 and 226 are elongate in the transport direction 206, each having a length that is around three times the length of the reader window 222 and the verification window 232. This reflects that in some examples programming a device takes around three times as long as reading device identification data from a device. As such, the device may remain in the area defined by the window 224 or 226 (for example, below the window 224 or 226) for the entire time while the device is being programmed.

Figure 4:
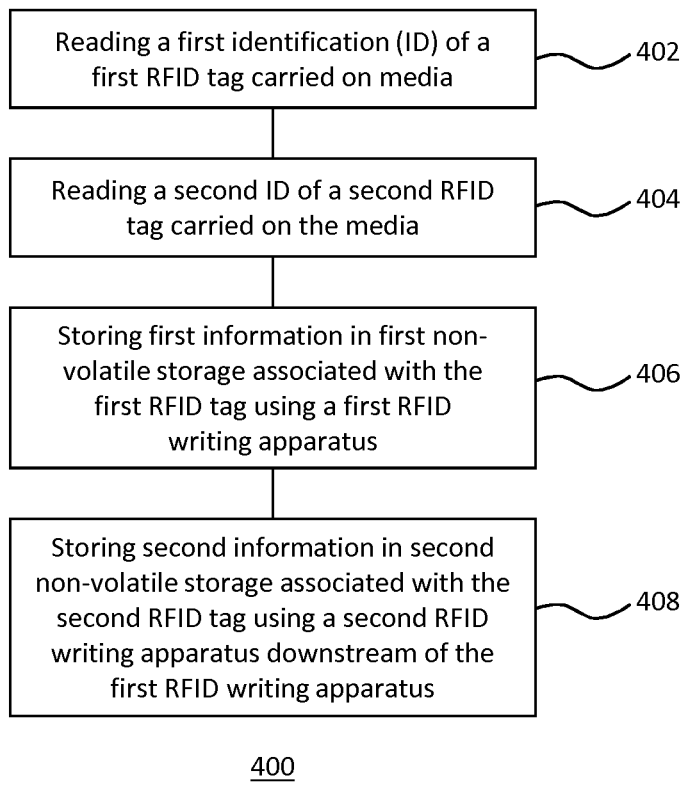
FIG. 4 is a flowchart of an example of a method of programming RFID tags.

FIG. 4 shows an example of a method 400, which may be for example a method of programming RFID devices, and which may in some examples be a computer implemented method. The method 400 includes, at block 402, reading a first identification (ID) of a first RFID tag carried on media, and at block 404, reading a second ID of a second RFID tag carried on the media. In some examples, the first and second IDs are read using the same RFID device reader.

The method also includes, in block 406, storing first information in first non-volatile storage associated with the first RFID tag using a first RFID writing apparatus, and in block 408, storing second information in second non-volatile storage associated with the second RFID tag using a second RFID writing apparatus downstream of the first RFID writing apparatus. The second RFID writing apparatus is downstream of the first RFID writing apparatus in the sense that, for example, as the tags are moved, each tag will encounter (e.g. move past) the first RFID writing apparatus, and then encounter (e.g. move past) the second RFID writing apparatus. However, each device is written to by one of the first or second writing apparatus.

Figure 5:
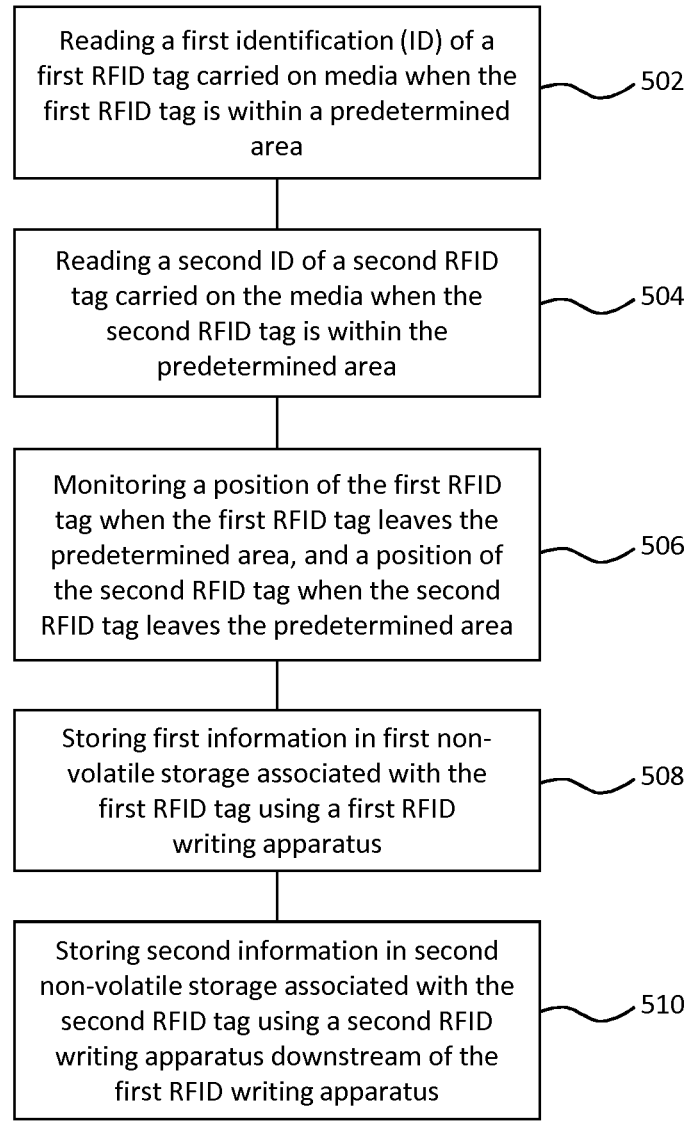
FIG. 5 is a flowchart of an example of a method of programming RFID tags.

FIG. 5 shows an example of a method 500, which may be for example a method of programming RFID tags. The method 500 includes, in block 502, reading a first identification (ID) of a first RFID tag carried on media when the first RFID tag is within a predetermined area. The position of the first RFID tag may therefore be determined. The method 500 also includes, in block 504, reading a second ID of a second RFID tag carried on the media when the second RFID tag is within the predetermined area. Therefore, in some examples, the first RFID tag may be moved out of the predetermined area after reading, such that the second RFID tag can be moved into the predetermined area. The position of the second RFID tag may also be determined.

In block 506, the method 500 includes monitoring a position of the first RFID tag when the first RFID tag leaves the predetermined area, and a position of the second RFID tag when the second RFID tag leaves the predetermined area. That is, in some examples, following subsequent movement of the first and second RFID tags, their position continues to be monitored or estimated, for example by monitoring the speed at which the tags are moved. In some examples, the time taken for the tags to reach a second position may be predetermined (e.g. by setting or determining the speed at which the tags are moved) and hence the time at which each tag reaches the second position may be determined. In other examples, any other process for determining the position of a tag with a particular ID at a particular time, or determining the time at which a tag with a particular ID may arrive at a certain position, may be used.

The method 500 includes, in block 508, storing first information in first non-volatile storage associated with the first RFID tag using a first RFID writing apparatus, and in block 510, storing second information in second non-volatile storage associated with the second RFID tag using a second RFID writing apparatus downstream of the first RFID writing apparatus, for example similar to blocks 406 and 408 of FIG. 4.

Knowing the position of a tag with a particular device ID, or knowing when a tag with a particular device ID will arrive at a certain position, may allow the first and second RFID tag writing apparatus in some examples to write to nearby tags using the appropriate ID. Furthermore, in some examples where tags are associated with printed labels that show data, information associated with that data can be written to the correct tag using the tag's ID. For example, a printed label may show an electronic product code (EPC), and the same EPC may be stored in a RFID tag associated with that label.

Figure 6:
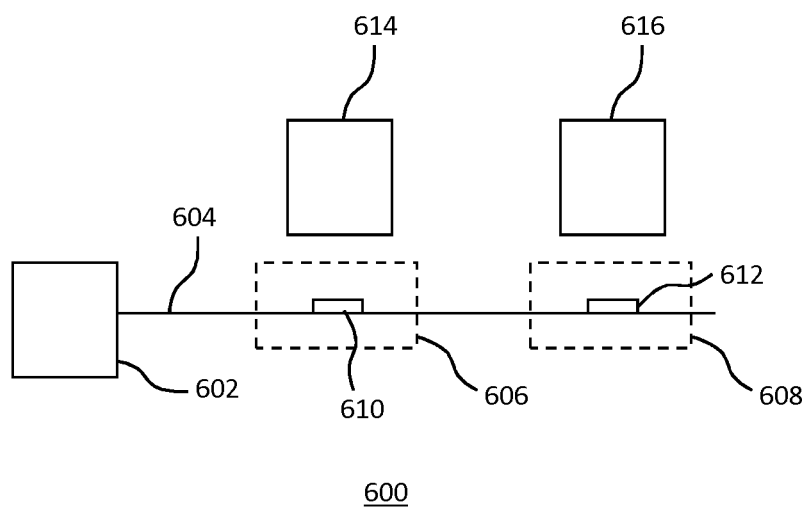
FIG. 6 is a simplified schematic of an example of a system for writing data to RFID tags.

FIG. 6 shows a system 600, which may be for example a system for writing data to RFID tags. The system 600 includes conveyance apparatus 602 to convey a substrate 604 carrying RFID tags through a first writing zone 606 of the apparatus 600 and subsequently through a second writing zone 608 of the apparatus 600. Two tags 610 and 612 are shown on the substrate 604 in the first writing zone 606 and second writing zone 608 respectively, although in some examples there may be more tags on the substrate 604.

The apparatus also includes a first RFID tag writing device 614 to write data to RFID tags in the first writing zone 606, and a second RFID tag writing device 616 to write data to RFID tags in the second writing zone 608. Therefore, for example, as the conveyance apparatus conveys the substrate carrying the tags through the first and second writing zones 606 and 608, the writing devices 614 and 616 can write data to different tags at least partly in parallel. As a result, in some examples the speed of the substrate 604 can be increased compared to a system that includes fewer RFID tag writing devices.

Figure 7:
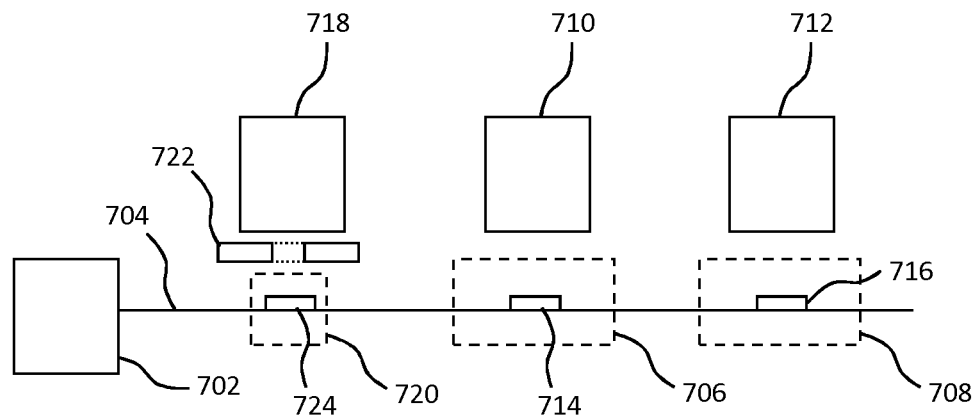
FIG. 7 is a simplified schematic of an example of another system for writing data to RFID tags.

FIG. 7 shows a system 700, which may be for example a system for writing data to RFID tags. The system 700 includes conveyance apparatus 702 to convey a substrate 704 carrying RFID tags through a first writing zone 706 of the apparatus 700 and subsequently through a second writing zone 708 of the apparatus 700 in a manner similar to the system 600 of FIG. 6. As in FIG. 6, the system 700 of FIG. 7 includes a first RFID tag writing device 710 and a second RFID tag writing device 712 for writing data to tags in the first and second writing zones 706 and 708 respectively. RFID tags 714 and 716 are shown in the first and second writing zones 706 and 708 respectively.

The system 700 also includes a RFID tag reader 718 to read device IDs of tags in a reading zone 720 of the apparatus, and shielding 722 to prevent the RFID tag reader from reading device IDs of tags outside of the reading zone. In the example shown, a RFID tag 724 is shown in the reading zone 720. The reading zone 720 may in some examples be smaller than the writing zone 706 and/or 708 as the time taken to read a device ID from a tag may be shorter than the time taken to write data to a tag. This may in some examples allow data to be written to tags without pausing movement of the substrate 704.

In some examples, the presence of the shielding 722 allows the reader 718 to read the device ID of a tag when the tag is in the reading zone 720. As a result, when the device ID is read from a tag, the tag is in a well-defined place within the system 700, and its position is determined. This information can be used to determine the device ID of each device passing through the writing zones 706 and 708, such that the writing devices 710 and 712 can address the correct tags passing through the writing zones 706 and 708 respectively.

In some examples, the writing devices 710 and 712 write data to different tags. In some examples, the first RFID tag writing device 710 writes data to a first subset of the RFID tags, and the second RFID tag writing device 712 writes data to a second, different subset of the RFID tags, wherein the tags of the first and second subsets alternate on the substrate in a conveyance direction of the substrate. In other words, for example, the first writing device 710 writes data to first, third and fifth tags, and so on, whereas the second writing device 712 writes data to second, fourth and sixth tags, and so on. However, in other examples any other suitable arrangement of the first and second subsets of tags on the substrate may be employed. The writing devices 710 and 712 may in some examples be used to effectively write data to tags at least partly in parallel, which can enable tag writing to be performed more quickly than if fewer writing devices are used.

Some examples include a "line" of RFID devices arranged along the direction of movement of the devices, and a plurality of writing devices that program different devices in the line of devices, also referred to as a column of devices. In some examples, there may be further devices arranged in a row, for example in a line perpendicular to the transport direction. For example, devices could be arranged also across the width of a substrate as well as its length, forming a grid of devices on the substrate. In such examples, there may be further RFID writing apparatus arranged across the width of the substrate and for programming a row of devices in parallel.

In some examples of a method, apparatus or system, each RFID device (e.g. tag) may be associated with a printed label that displays certain information. The position of each label may be tracked as it enters a programming apparatus or system. As a result, when the device ID of a RFID device is read by a reader when the device is in a predetermined position or within a predetermined area, the device ID of a device that is associated with a particular label may be determined. Consequently, information that may be programmed into the RFID device may be the correct information that is associated with the printed label, for example information relating to a serial number or electronic product code (EPC) that is represented on the label. Monitoring the position of each device in this way may help to prevent information being programmed into the wrong RFID device.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A radio frequency identification (RFID) device programming apparatus comprising:
   a transport system to transport media in a transport direction;
   an RFID device reader to obtain first device identification data from a first RFID device on the media and second device identification data from a second RFID device on the media, the second RFID device being offset from the first RFID device on the media in the transport direction;
   a first RFID device programmer to write first data to the first RFID device associated with the first device identification data, while the first RFID device is on the media transported by the transport system in the transport direction;
   a second RFID device programmer to write second data to the second RFID device associated with the second device identification data, while the second RFID device is on the media transported by the transport system in the transport direction; and
   an RFID verification device to verify programming of the first RFID device on the media and the second RFID device on the media.

2. The RFID device programming apparatus of claim 1, wherein the RFID device reader comprises a reader electromagnetic shield comprising a first window through which the RFID device reader reads:
   the first device identification data when the first RFID device on the media is in a predetermined position, and
   the second device identification data when the second RFID device on the media is in the predetermined position.

3. The RFID device programming apparatus of claim 2, wherein the first RFID device programmer comprises a programmer electromagnetic shield including a second window that is larger than the first window of the reader electromagnetic shield, and the first RFID device programmer is to write the first data to the first RFID device through the second window when the first RFID device on the media is moved to a position proximate the second window.

4. The RFID device programming apparatus of claim 1, wherein the RFID device programming apparatus is to track a position of the first RFID device after the RFID device reader has obtained the first device identification data, and track a position of the second RFID device after the RFID device reader has obtained the second device identification data.

5. The RFID device programming apparatus of claim 1, wherein the RFID reader, the first RFID device programmer and the second RFID device programmer are arranged along a line in the transport direction.

6. The RFID device programming apparatus of claim 1, wherein the RFID device reader is to obtain third device identification data from a third RFID device on the media, and the RFID device programming apparatus comprises a third RFID device programmer to write third data to the third RFID device using the third device identification data.

7. The RFID device programming apparatus of claim 1, wherein the first RFID device programmer and the second RFID device programmer are to simultaneously program the first and second RFID devices, respectively, while the first and second RFID devices are on the media and in motion as the media is transported by the transport system in the transport direction.

8. The RFID device programming apparatus of claim 1, wherein the first RFID device is associated with a first printed label, and the second RFID device is associated with a second printed label, wherein the first data written to the first RFID device is related to information printed on the first printed label, and the second data written to the second RFID device is related to information printed on the second printed label.

9. The RFID device programming apparatus of claim 1, wherein the first RFID device programmer is a first RFID tag writing device, and the second RFID device programmer is a second RFID tag writing device, and wherein the first RFID tag writing device is to write the first data to the first RFID device while the first RFID device on the media is in motion, and the second RFID tag writing device is to write the second data to the second RFID device while the second RFID device on the media is in motion.

10. The RFID device programming apparatus of claim 9, wherein the first RFID tag writing device is to write the first data to the first RFID device in parallel with the second RFID tag writing device writing the second data to the second RFID device, without stopping a movement of the media along the transport direction.

11. The RFID device programming apparatus of claim 1, wherein the transport system comprises a support to receive the media, the RFID device programming apparatus further comprising:
an electromagnetic shield, wherein the support of the transport system is arranged on a first side of the electromagnetic shield, and the RFID device reader, the first RFID device programmer, and the second RFID device programmer are arranged on a second, opposite side of the electromagnetic shield,
wherein the electromagnetic shield comprises:
a first window through which the RFID device reader reads:
the first device identification data from the first RFID device as the first RFID device on the media is moved past the first window, and
the second device identification data from the second RFID device as the second RFID device on the media is moved past the first window,
a second window through which the first RFID device programmer writes the first data to the first RFID device as the first RFID device on the media is moved past the second window, and
a third window through which the second RFID device programmer writes the second data to the second RFID device as the second RFID device on the media is moved past the third window.

12. The RFID device programming apparatus of claim 11, wherein each of the second window and the third window has a longer dimension in the transport direction than the first window.

13. A method comprising:
reading, by a radio frequency identification (RFID) reader, a first identification (ID) of a first RFID tag on a media transported along a transport direction, wherein reading the first ID of the first RFID tag occurs when the first RFID tag is within a predetermined area;
reading, by the RFID reader, a second ID of a second RFID tag on the media transported along the transport direction, wherein reading the second ID of the second RFID tag occurs when the second RFID tag is within the predetermined area;
writing, by a first RFID tag writing device, first information to a first non-volatile storage of the first RFID tag while the first RFID tag is on the media that is transported along the transport direction;
writing, by a second RFID tag writing device, second information to a second non-volatile storage of the second RFID tag while the second RFID tag is on the media that is transported along the transport direction, wherein the second RFID tag writing device is downstream of the first RFID tag writing device along the transport direction; and
monitoring a position of the first RFID tag when the first RFID tag leaves the predetermined area, and a position of the second RFID tag when the second RFID tag leaves the predetermined area.

14. The method of claim 13, wherein the first RFID tag writing device writes the first information to the first non-volatile storage of the first RFID tag in parallel with the second RFID tag writing device writing the second information to the second non-volatile storage of the second RFID tag.

15. A system comprising:
a transport support to convey a substrate carrying a plurality of RFID tags through a first writing zone of the system and subsequently through a second writing zone of the system;
a first RFID tag writing device to write data to a first subset of the plurality of RFID tags in the first writing zone as RFID tags of the first subset are moved along a transport direction by the substrate through the first writing zone;
a second RFID tag writing device to write data to a second subset of the plurality of RFID tags in the second writing zone as RFID tags of the second subset are moved along the transport direction by the substrate through the second writing zone,
wherein the second subset is different from the first subset and
an RFID verification device to verify writing of data to the first subset of the plurality of RFID tags on the substrate, and writing of data to the second subset of the plurality of RFID tags on the substrate.

16. The system of claim 15, comprising:
an RFID tag reader to read device IDs of the plurality of RFID tags in a reading zone of the system; and
an electromagnetic shield, wherein the transport support is arranged on a first side of the electromagnetic shield, and the RFID tag reader, the first RFID tag writing device, and the second RFID tag writing device are arranged on a second, opposite side of the electromagnetic shield.

17. The system of claim 16, wherein the electromagnetic shield comprises:
a first window through which the RFID tag reader reads the device IDs of the plurality of RFID tags as respective RFID tags of the plurality of RFID tags pass by the first window,
a second window through which the first RFID tag writing device writes data to the RFID tags of the first subset in the first writing zone, and
a third window through which the second RFID tag writing device writes data to the RFID tags of the second subset in the second writing zone,
wherein each of the second window and the third window has a longer dimension in the transport direction than the first window.

* * * * *